United States Patent
Yang

(10) Patent No.: US 10,939,343 B2
(45) Date of Patent: Mar. 2, 2021

(54) METHOD AND TERMINAL DEVICE FOR CELL RESELECTION

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/632,157

(22) PCT Filed: Aug. 23, 2017

(86) PCT No.: PCT/CN2017/098618
§ 371 (c)(1),
(2) Date: Jan. 17, 2020

(87) PCT Pub. No.: WO2019/036933
PCT Pub. Date: Feb. 28, 2019

(65) Prior Publication Data
US 2020/0236601 A1    Jul. 23, 2020

(51) Int. Cl.
*H04W 36/36* (2009.01)
*H04W 36/08* (2009.01)

(52) U.S. Cl.
CPC ........... *H04W 36/08* (2013.01); *H04W 36/36* (2013.01)

(58) Field of Classification Search
CPC ..................................................... H04W 36/08
See application file for complete search history.

(56) References Cited

U.S. PATENT DOCUMENTS

| 2010/0197310 | A1 | 8/2010 | Jung et al. | |
| 2014/0099912 | A1* | 4/2014 | Lee | H04W 48/08 455/404.1 |
| 2018/0132145 | A1* | 5/2018 | Cao | H04W 36/00837 |

FOREIGN PATENT DOCUMENTS

| CN | 105451335 A | 3/2016 |
| CN | 106879009 A | 6/2017 |
| RU | 2570901 C2 | 12/2015 |

OTHER PUBLICATIONS

Extended European Search Report for EP Application 17922212 dated Jun. 29, 2020.
3GPP TSG-RAN WG2 Meeting #98; Hangzhou, China, May 15-19, 2017; R2-1704244.
3GPP TSG-RAN WG2 Ad Hoc on NR; Qingdao, P.R. of China, Jun. 27-29, 2017; R2-1707278.
3GPP TSG-RAN WG2 meeting #99 R2-1707601; Berlin, Germany, Aug. 21-25, 2017.

(Continued)

*Primary Examiner* — Michael T Vu

(57) ABSTRACT

A method and a terminal device for cell reselection are provided. The method is applied to a terminal device. A connection between the terminal device and a network device is in a disconnected state, and the network device retains context information of the terminal device, the context information being used to establish a connection between the terminal device and the network device. The method comprises: when the terminal device triggers a cell reselection operation, determining a serving cell of the terminal device according to a configuration of an initial paging area of the terminal device.

9 Claims, 2 Drawing Sheets

(56) References Cited

OTHER PUBLICATIONS

3GPP TSG-RAN WG2 Meeting #99; Berlin, Germany, Aug. 21-25, 2017; R2-1708815.
Russia Office Action with English Translation for RU 2020104823/07(007419) dated Oct. 20, 2020.

* cited by examiner

METHOD AND TERMINAL DEVICE FOR CELL RESELECTION

CROSS-REFERENCE TO RELATED APPLICATION(S)

This application is a 371 application of International Application No. PCT/CN2017/098618, filed on Aug. 23, 2017, the entire disclosure of which is hereby incorporated by reference.

TECHNICAL FIELD

Implementations of the present disclosure relate to a communication field, and more particularly, to a method for cell reselection and a terminal device.

BACKGROUND

With people's pursuit of speed, delay, high-speed mobility and energy efficiency, and diversity and complexity of services in future life, the 3rd Generation Partnership Project (3GPP) International Standards Organization began to develop 5-Generation (5G) mobile communication technology. The main application scenarios of 5G are: Enhance Mobile Broadband (eMBB), Ultra-Reliable and Low Latency Communication (URLLC), Mass Machine Type of Communication (mMTC). Wherein, eMBB aims at making a user obtain multimedia content, service and data. In addition, because eMBB may be deployed in different scenarios such as indoor, urban, rural, the differences of capabilities and requirements are quite large. Typical applications of URLLC include: industrial automation, power automation, telemedicine operation (surgery), traffic safety, etc. Typical characteristics of mMTC include: high connection density, small data volume, delay-insensitive service, low cost and long service life of module, etc.

In order to reduce air interface signaling, quickly resume wireless connection and quickly resume data service in a 5G network environment, a new Radio Resource Control (RRC) state, namely radio resource control inactive (RRC_INACTIVE) state, is defined.

However, when a User Equipment (UE) is in the RRC_INACTIVE state, a network side configures a paging area of a Radio Access Network (RAN) for the UE. When the UE moves in the paging area, the network side is not notified, and a mobility behavior under RRC_IDLE, that is, a cell selecting reselection criterion, is followed. When the UE moves out of the paging area, the UE will be triggered to resume an RRC connection and reacquire the paging area configured by the network side.

From this, the UE in RRC_INACTIVE state reselects a cell to reside according to a way of cell reselection during the moving process. In the prior art, the cell reselection is performed according to a frequency priority and a cell measurement quality to select a target cell. If the UE in RRC_INACTIVE state continues to use a cell selecting criterion of the prior art, the UE may be caused to frequently initiate a location updating process, thus increasing the air interface signaling load.

SUMMARY

A method for cell reselection and a terminal device are provided.

In a first aspect, a method for cell reselection is provided, the method is applied to a terminal device, a connection between the terminal device and a network device is in a disconnected state, and the network device retains context information of the terminal device, and the context information is used for establishing the connection between the terminal device and the network device. The method includes: when the terminal device triggers a cell reselection operation, determining a serving cell of the terminal device according to a configuration situation of initial paging area of the terminal device.

In some possible implementation modes, determining the serving cell of the terminal device according to the configuration situation of the initial paging area of the terminal device includes: if the terminal device is configured with the initial paging area and the cell of at least one first cell in the initial paging area satisfies a cell selection criterion, S criterion, determining, by the terminal device, the serving cell in the at least one first cell.

In some possible implementation modes, determining, by the terminal device, the serving cell in the at least one first cell, includes: if the at least one first cell is multiple first cells, determining, by the terminal device, the serving cell in the multiple first cells according to frequency priority information corresponding to each first cell and/or cell quality information of each first cell.

In some possible implementation modes, determining the serving cell of the terminal device according to the configuration situation of the initial paging area of the terminal device includes: if the terminal device is configured with the initial paging area and each cell in the initial paging area does not satisfy the cell selection criterion, S criterion, determining, by the terminal device, the serving cell in at least one second cell, wherein the initial paging area does not overlap with the at least one second cell.

In some possible implementation modes, determining the serving cell of the terminal device according to the configuration situation of the initial paging area of the terminal device includes: if the network device does not configure the initial paging area for the terminal device, determining, by the terminal device, the serving cell in at least one third cell, wherein the at least one third cell is a cell measured by the terminal device.

In some possible implementation modes, before determining the serving cell of the terminal device, the method further includes: receiving, by the terminal device, a system message or a network configuration message, wherein the system message or the network configuration message includes information for determining the serving cell of the terminal device.

In some possible implementation modes, a frequency priority of each cell in the initial paging area is higher than that of a cell outside the initial paging area.

In some possible implementation modes, a cell where the terminal device resides in the initial paging area has a highest frequency priority.

In a second aspect, a terminal device is provided, a connection between the terminal device and a network device is in a disconnected state, and the network device retains context information of the terminal device, the context information is used for establishing the connection between the terminal device and the network device.

The terminal device includes: a determining unit, used for determining a serving cell of the terminal device according to a configuration situation of an initial paging area of the terminal device when a cell reselection operation is triggered.

In a third aspect, a terminal device is provided, a connection between the terminal device and a network device is in a disconnected state, and the network device retains context information of the terminal device, the context information is used for establishing the connection between the terminal device and the network device.

The terminal device includes: a processor, used for determining a service cell of the terminal device according to a configuration situation of an initial paging area of the terminal device when triggering a cell reselection operation is triggered.

In a fourth aspect, a computer readable medium is provided for storing a computer program. The computer program includes instructions used for executing the method implementations of the above first aspect.

In a fifth aspect, a computer chip is provided, including: an input interface, an output interface, at least one processor, and a memory. The processor is used for executing codes in the memory. When the codes are executed, the processor may implement various processes implemented by the terminal device in the method for cell reselection in the above first aspect and various implementation modes thereof.

In a sixth aspect, a communication system is provided, including the above-mentioned terminal device.

DETAILED DESCRIPTION

Figure 1:
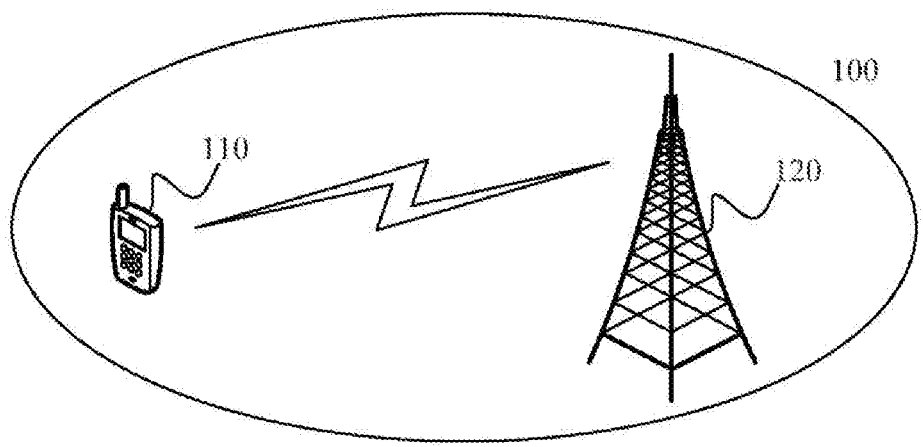
FIG. 1 is an example of a communication system according to an implementation of the present disclosure.

FIG. 1 is a schematic diagram of a communication system according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120. Wherein, the terminal device 110 may be in an RRC_INACTIVE state.

The RRC_INACTIVE state is different from an RRC_IDLE state and an RRC_ACTIVE state. In order to facilitate the understanding of the solution, the following is a brief introduction to the terminal device in the RRC_INACTIVE state.

Specifically, for the RRC_IDLE state, no RRC connection exists between the terminal device and the network device, and the network device does not store context information of the terminal device. When the terminal device needs to be paged, a core network initiates paging, and the core network configures a paging area. Its mobility is cell selection or cell reselection based on the terminal device. For the RRC_ACTIVE state, the RRC connection exists between the terminal device and the network device, and the network device and the terminal device store the context information of the terminal device. A location of the terminal device acquired by the network device is at a specific cell level. Its mobility is a mobility controlled by the network device.

However, for the RRC_INACTIVE state, a connection exists between the core network (CN) and the network device, the context information of the terminal device is stored on a network device, the paging is triggered by a Radio Access Network (RAN), and the RAN manages the paging area of the RAN, that is, the location of the terminal device acquired by the network device is at the paging area level of the RAN. Its mobility is the cell selection or cell reselection based on the terminal device. In other words, the connection between the terminal device in the RRC_INACTIVE state and the network device is in a disconnected state, and the network device retains the context information of the terminal device, which is used for quickly establishing the connection between the terminal device and the network device.

For example, assuming that the terminal device is in the RRC_INACTIVE state, the network device configures the terminal device with the paging area of the RAN which may include multiple cells. For convenience of description, in an implementation of the present disclosure, optionally, the paging area of the RAN may be referred as the initial paging area, or the paging area preconfigured by the network device for the terminal device may be referred as the initial paging area. In other words, when the terminal device performs the cell reselection, the terminal device is triggered to resume the RRC connection based on the initial paging area.

Specifically, when the terminal device performs the cell reselection, if the terminal device moves in the initial paging area, the network device will not be notified. More specifically, the terminal device may follow mobility behaviors under RRC_IDLE, that is, follow the cell selecting reselection principle under RRC_IDLE to perform the cell reselection. If the terminal device moves out of the initial paging area, the terminal device may be triggered to resume the RRC connection and reacquire the paging area configured by the network device.

However, when the terminal device performs the cell reselection, if a target cell is selected only according to a frequency priority and a cell measurement quality, the terminal device may be frequently triggered to resume the RRC, which may further cause the terminal device to frequently acquire the paging area reconfigured by the network device, increasing the air interface signaling load.

An implementation of the invention provides a method for cell reselection. By redefining the cell reselection criterion and the cell reselection priority, the terminal device may reside in the initial paging area to the greatest extent possible, thereby reducing the probability of initiating the location update process by the terminal device and achieving the purpose of reducing the air interface signaling load.

It should be understood that an implementation of the present disclosure may be applied to any communication system including a terminal device in an RRC_INACTIVE state. It should be understood that the communication system 100 is only an example for describing the implementation of the present disclosure. However, an implementation of the present disclosure is not limited to this. That is, the technical solutions of implementations of the present disclosure may be applied to various communication systems, such as a Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Time Division Duplex (TDD), Universal Mobile Telecommunication System (UMTS) system.

In the present disclosure, various implementations are described in combination with a network device and a terminal device.

The network device 120 may refer to any entity on the network side for sending or receiving signals. For example, it may be a user equipment of machine type communication (MTC), a Base Transceiver Station (BTS) in GSM or CDMA, a base station (NodeB) in WCDMA, an evolution base station (eNB or NodeB) in LTE, a base station equipment in 5G network, etc.

In addition, the terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an on-board device, a wearable device, a terminal device in a 5G network or the like.

The implementation mode of the method for cell reselection according to an implementation of the present disclosure will be described in detail below.

Figure 2:
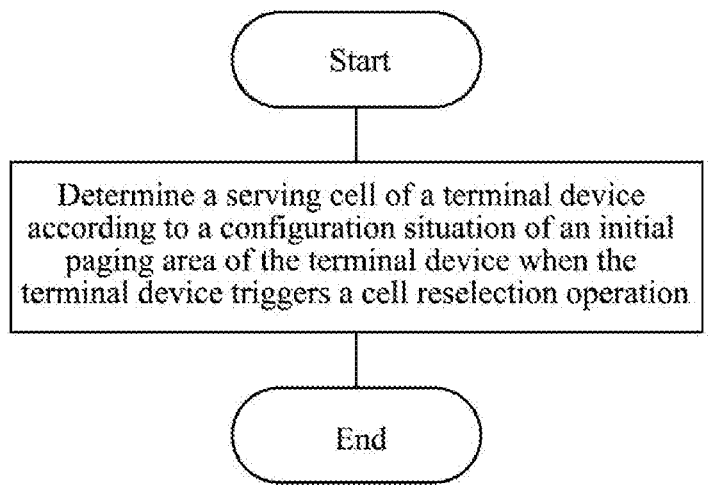
FIG. 2 is a schematic flowchart of a method for cell reselection according to an implementation of the present disclosure.

Optionally, as shown in FIG. 2, when the terminal device triggers the cell reselection operation, the serving cell of the terminal device is determined according to a configuration situation of the initial paging area of the terminal device.

Specifically, the connection between the terminal device and the network device is in the disconnected state, and the network device retains the context information of the terminal device, the context information is used for establishing the connection between the terminal device and the network device. When the terminal device triggers the cell reselection operation, the service cell of the terminal device is determined according to the configuration situation of the initial paging area of the terminal device.

In other words, a terminal device in an implementation of the present disclosure may determine the serving cell of the terminal device for different conditions according to whether the terminal device is configured with the initial paging area. That is, when the terminal device is configured with the initial paging area, the serving cell of the terminal device may be determined according to some way. When the terminal device is not configured with the initial paging area, the serving cell of the terminal device may be determined according to another way. It should be understood that the configuration situation of the initial paging area in an implementation of the present disclosure may be whether the terminal device is configured with the initial paging area, or may be a configuration way of configuring the initial paging area for the terminal device. It may also be configuration information for configuring the initial paging area for the terminal device, for example, a type of the initial paging area, etc. This is not specifically restricted in an implementation of the present disclosure.

A method of performing a cell reselection by a terminal device will be described below by taking that a configuration situation of an initial paging area is whether the terminal device is configured with the initial paging area as an example.

For a scenario where the terminal device is configured with the initial paging area:

As an implementation, in the initial paging area, there exists a cell where the terminal device resides.

Optionally, if the terminal device is configured with the initial paging area and the cell of at least one first cell in the initial paging area satisfies the cell selection criterion, S criterion, the terminal device determines the serving cell in the at least one first cell.

Specifically, when the terminal device is configured with the initial paging area and the cell of at least one first cell in the initial paging area satisfies the following conditions, the terminal device determines the serving cell in the at least one first cell:

$$Srxlev > 0 \qquad (1)$$

$$Srxlev = Qrxlevmeas - (Qrxlevmin + Qrxlevminoffset) - Pcompensation \qquad (2).$$

Srxlev is a level value calculated in the cell selection/reselection process. Qrxlevmeas refers to a measured cell reception signal level value, for example, a measured Reference Signal Receiving Power (RSRP). Qrxlevmin is a minimum reception level needed by the cell. Qrxlevminoffset is valid only when normally residing in a Virtual Public Land Mobile Network (VPLMN) and periodically searching for a Public Land Mobile Network (PLMN) with a high priority for cell selection evaluation, there is a certain offset between this parameter and the Qrxlevmin. Pcompensation is $\max(P_{EMAX} - P_{UMAX}, 0)$, wherein PEMAX is a maximum allowable transmission power set by the system when the terminal device accesses the cell. $P_{UMAX}$ refers to a maximum output power specified according to the grade of the terminal device.

In the 3GPP specification, S criterion is used as one of bases for deciding whether a cell is suitable, and this will not be repeated here.

Optionally, in order to make the terminal device acquire the above information for determining the serving cell, the terminal device may receive the system message or the network configuration message before determining the serving cell of the terminal device, the system message or the network configuration message includes the information for determining the serving cell of the terminal device. For example, a System Information Block (SIB) including information for determining the serving cell of the terminal device is received. For example, in a selected PLMN, the terminal device reads SIB1 of the cell and acquires the Qrxlevmeas, Qrxlevmin and Qrxlevminoffset.

It should be understood that the above S criterion is only an example description of an implementation of the present disclosure, and implementations of the present disclosure are not limited thereto. That is, a focus of the implementations of the present disclosure is that when there is at least one first cell satisfying a residence condition in the initial paging area, the terminal device determines the serving cell in the at least one first cell preferentially.

That is to say, in an implementation of the present disclosure, if the terminal device is configured with the initial paging area and the cell of at least one first cell in the initial paging area satisfies the cell selection criterion, S criterion, even if the priority and quality of the cells outside the initial paging area are higher and better, the terminal device still determines the serving cell of the terminal device in the at least one first cell preferentially.

Therefore, the terminal device may reside in the initial paging area to the greatest extent possible, thereby reducing the probability of initiating the location update process by the terminal device, and achieving the purpose of reducing the air interface signaling load.

Optionally, if the at least one first cell is multiple first cells, the terminal device determines the serving cell in the multiple first cells according to frequency priority information corresponding to each first cell and/or cell quality information of each first cell.

For example, the terminal device may use a cell with the highest priority frequency in the multiple first cells as the serving cell.

For another example, the terminal device may use a cell with the best quality in the multiple first cells as the serving cell.

For another example, the terminal device determines the serving cell in the multiple first cells in comprehensive consideration of frequency priority and cell quality.

It should be understood that the above-mentioned implementation mode is only an example illustration of the method for cell reselection of an implementation of the present disclosure, and implementations of the present disclosure are not limited thereto.

For example, the terminal device may also directly determine the serving cell in the cells in the initial paging area through the frequency priority information corresponding to each cell and/or the cell quality information of each cell.

For another example, the terminal device may also determine the serving cell in the multiple first cells through the R criterion.

As another implementation, a cell where the terminal device resides exists in the initial paging area.

Optionally, if the terminal device is configured with the initial paging area and each cell in the initial paging area does not satisfy the cell selection criterion, S criterion, the terminal device determines the serving cell in at least one second cell, wherein the initial paging area does not overlap with the at least one second cell.

Specifically, if the terminal device is configured with the initial paging area and each cell in the initial paging area does not satisfy the residence condition, the terminal device determines the serving cell of the terminal device in the cells outside the initial paging area.

For a scenario where the terminal device is not configured with the initial paging area:

Optionally, if the network device does not configure the initial paging area for the terminal device, the terminal device determines the serving cell in at least one third cell, wherein the at least one third cell is the cell measured by the terminal device.

Specifically, if the network device does not configure the initial paging area for the terminal device, the terminal device determines the serving cell of the terminal device in the measured cell.

According to the configuration situation of the initial paging area, in combination with the terminal device, the implementation mode of the serving cell is determined. Furthermore, a method for cell reselection is further provided in an implementation of the present disclosure. By redefining the frequency priority of the cell, the terminal device may be enabled to reside in the initial paging area to the greatest extent possible, thereby reducing the probability of initiating the location update process by the terminal device, and achieving the purpose of reducing the air interface signaling load.

Specifically, in the prior art, the frequency priority of each cell used by the terminal device for the cell reselection is obtained through the system message or the network configuration message. In an implementation of the present disclosure, the frequency priority of the cell may be redefined by the terminal device or the user to achieve the purpose of enabling the terminal device to reside in the initial paging area to the greatest extent possible.

Optionally, frequency priorities for cells are distinguished at the level of the paging area. Specifically, the detected cells may be divided into cells in the initial paging area and cells outside the initial paging area, and the frequency priorities of the two cells are defined.

For example, the frequency priority of each cell in the initial paging area is higher than that of a cell outside the initial paging area. Further, the frequency priority of cells within the initial paging area may be obtained through the prior art, and the frequency priorities of cells outside the initial paging area may also be obtained through the prior art.

It should be understood that distinguishing the frequency priority of cells at the level of the paging area is only an example description, and implementations of the present disclosure are not limited thereto.

For example, it is also possible to redefine the frequency priority of some cells or a certain cell, and further, the frequency priorities of some cells are obtained through the prior art.

As an example rather than as a limitation, a cell in the initial paging area where the terminal device resides has the highest frequency priority. That is, if the terminal device resides currently in a cell in the initial paging area, the terminal device considers a frequency point of the cell where the terminal device resides currently is of the highest priority regardless of the frequency priority configured by the network side.

Figure 3:
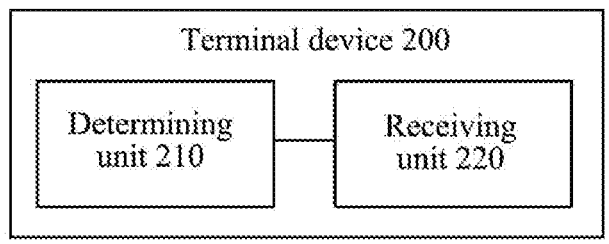
FIG. 3 is a schematic block diagram of a terminal device according to an implementation of the present disclosure.

FIG. 3 is a schematic block diagram of a terminal device 200 according to an implementation of the present disclosure.

As shown in FIG. 3, the terminal device 200 includes a determining unit 210.

The determining unit 210 is used for determining a serving cell of the terminal device according to a configuration situation of an initial paging area of the terminal device when a cell reselection operation is triggered. Wherein, a connection between the terminal device and a network device is in a disconnected state, and the network device retains context information of the terminal device, the context information is used for establishing the connection between the terminal device and the network device.

Optionally, the determining unit 210 is specifically used for: if the terminal device is configured with the initial paging area and the cell of at least one first cell in the initial paging area satisfies the cell selection criterion, S criterion, determining the serving cell in the at least one first cell.

Optionally, the determination unit 210 is further specifically used for: if the at least one first cell is multiple first cells, determining the serving cell in the multiple first cells according to frequency priority information corresponding to each first cell and/or cell quality information of each first cell.

Optionally, the determining unit 210 is specifically used for: if the terminal device is configured with the initial paging area and each cell in the initial paging area does not satisfy the cell selection criterion, S criterion, determining the serving cell in at least one second cell, wherein the initial paging area does not overlap with the at least one second cell.

Optionally, the determination unit 210 is specifically used for: if the network device does not configure the initial paging area for the terminal device, determining the serving cell in at least one third cell, wherein the at least one third cell is the cell measured by the terminal device.

Optionally, the terminal device further includes: a receiving unit 220, used for receiving a system message or a network configuration message before the serving cell of the terminal device is determined, wherein the system message or the network configuration message includes information for determining the serving cell of the terminal device.

Optionally, a frequency priority of each cell in the initial paging area is higher than that of a cell outside the initial paging area.

Optionally, a cell where the terminal device resides in the initial paging area has a highest frequency priority.

Figure 4:
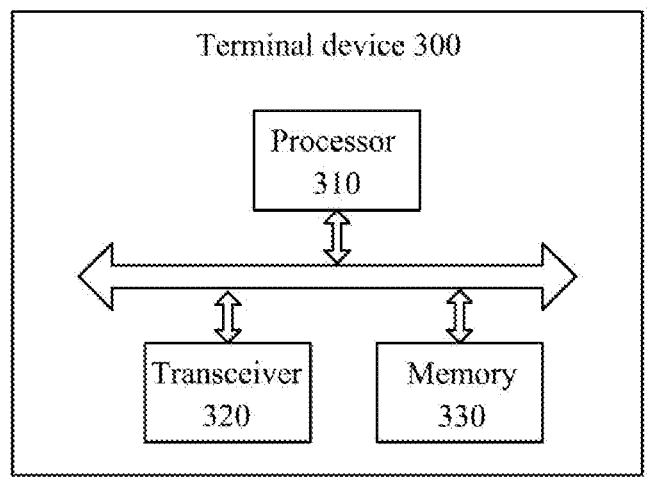
FIG. 4 is another schematic block diagram of a terminal device according to an implementation of the present disclosure.

In an implementation of the present disclosure, the determining unit 210 may be implemented by a processor, and the receiving unit 220 may be implemented by a transceiver. As shown in FIG. 4, a terminal device 300 may include a processor 310, a transceiver 320, and a memory 330. The memory 330 may be used for storing indication information, or may be used for storing codes, instructions, etc., executed by the processor 310. Various components in the terminal device 300 are connected by a bus system. The bus system includes a power bus, a control bus and a status signal bus in addition to a data bus.

The terminal device 300 shown in FIG. 4 may implement the various processes implemented by the terminal device in the method implementation described above. In order to avoid duplication, the details will not be repeated here. That is, the method implementation in an implementation of the present disclosure may be applied to or implemented by a processor.

Specially, in an implementation process, each act of the method implementations in implementations of the present disclosure may be completed by integrated logic circuits of hardware in the processor or instructions in a form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the acts of the above method in combination with its hardware.

The processor may be an integrated circuit chip with a capability for processing signals, and may implement or execute various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the memory in an implementation of the present disclosure may be a volatile memory or non-volatile memory, or may include both the volatile memory and the non-volatile memory. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. It should be understood that, the foregoing memory is an example rather than as a limitation. For example, a memory in an implementation of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synch link DRAM (SLDRAM), Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are also intended to include the plural forms unless the context clearly indicates other meanings.

For another example, terms, e.g. a first cell, a second cell may be used in implementations of the present disclosure, but these cells should not be limited to these terms. These terms are only used for distinguishing types of cell groups from each other.

For another example, depending on the context, the wording "when" as used herein may be interpreted as "if" or "whether" or "while" or "in response to a determination of/that" or "in response to a detection of/that". Similarly, depending on the context, the phrase "if determining" or "if detecting (a stated condition or event)" may be interpreted as "when . . . is determined" or "in response to a determination" or "when (a stated condition or event) is detected" or "in response to a detection of (a stated condition or event)".

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on specific applications and design constraints of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, a specific working process of the system, device and unit described above may refer to a corresponding process in the aforementioned method implementation, and details are not described here again.

In several implementations provided by the present disclosure, it should be understood that the disclosed systems, devices and methods may be implemented in other ways. For example, the device implementations described above are only illustrative. For example, the division of the units is only a logical function division, and there may be other division modes in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units may be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes a medium capable of storing program codes, such as, a U disk, a mobile hard disk, a read-only memory, a random access memory, a magnetic disk, or an optical disk.

What are described above are merely the specific implementation modes of implementations of the present disclosure, but a protection scope of the implementations of the present disclosure is not limited thereto. Any change or substitution that may be easily conceived by a person skilled in the art within a technical scope disclosed by the implementations of the present disclosure shall be included within the protection scope of the implementations of the present disclosure. Therefore, the protection scope of the implementations of the present disclosure should be subject to a protection scope of the claims.

What is claimed is:

1. A method for cell reselection, applied to a terminal device, wherein a connection between the terminal device and a network device is in a disconnected state, and the network device retains context information of the terminal device, and the context information is used for establishing the connection between the terminal device and the network device; and
the method comprises:
when the terminal device triggers a cell reselection operation, determining a serving cell of the terminal device according to a configuration situation of an initial paging area of the terminal device; wherein determining the serving cell of the terminal device according to the configuration situation of the initial paging area of the terminal device comprises:
when the terminal device is configured with the initial paging area and at least one first cell in the initial paging area satisfies a cell selection criterion, S criterion, determining, by the terminal device, the serving cell in the at least one first cell; wherein determining, by the terminal device, the serving cell in the at least one first cell, comprises:
when the at least one first cell is a plurality of first cells, determining, by the terminal device, the serving cell in the plurality of first cells according to frequency priority information corresponding to each first cell and/or cell quality information of each first cell.

2. The method of claim 1, the method further comprises:
before determining the serving cell of the terminal device,
receiving, by the terminal device, a system message or a network configuration message, wherein the system message or the network configuration message comprises information for determining the serving cell of the terminal device.

3. The method of claim 1, wherein
a frequency priority of each cell in the initial paging area is higher than that of a cell outside the initial paging area.

4. The method of claim 1, wherein,
a cell where the terminal device resides in the initial paging area has a highest frequency priority.

5. A terminal device, wherein a connection between the terminal device and a network device is in a disconnected state, and the network device retains context information of the terminal device, the context information is used for establishing the connection between the terminal device and the network device; and
the terminal device comprises: a processor and a transceiver, wherein
the processor is configured to determine a serving cell of the terminal device according to a configuration situation of an initial paging area of the terminal device when a cell reselection operation is triggered; wherein the processor is specifically configured to:
when the terminal device is configured with the initial paging area and at least one first cell in the initial paging area satisfies a cell selection criterion, S criterion, determine the serving cell in the at least one first cell; wherein the processor is specifically configured to:
when the at least one first cell is a plurality of first cells, determine the serving cell in the plurality of first cells according to frequency priority information corresponding to each first cell and/or cell quality information of each first cell.

6. The terminal device of claim 5, wherein the terminal device further comprises:
the transceiver is configured to receive a system message or a network configuration message before the serving cell of the terminal device is determined, wherein the system message or the network configuration message comprises information for determining the serving cell of the terminal device.

7. The terminal device of claim 5, wherein,
a frequency priority of each cell in the initial paging area is higher than that of a cell outside the initial paging area.

8. The terminal device of claim 5, wherein,
a cell where the terminal device resides in the initial paging area has a highest frequency priority.

9. A chip, comprising an input interface, an output interface, at least one processor, and a memory, wherein the processor is used for executing codes in the memory to implement the method of claim 1.

* * * * *